United States Patent [19]
Chevallier

[11] Patent Number: 5,988,270
[45] Date of Patent: Nov. 23, 1999

[54] COUPLING DEVICE FOR A PLATE-TYPE HEAT EXCHANGER, ESPECIALLY FOR MOTOR VEHICLES

[75] Inventor: Christophe Chevallier, Le Mans, France

[73] Assignee: Valeo Climatisation, La Verriere, France

[21] Appl. No.: 08/824,831

[22] Filed: Mar. 26, 1997

[30] Foreign Application Priority Data

Mar. 28, 1996 [FR] France .................................. 96 03899

[51] Int. Cl.⁶ ............................................. F28F 9/16
[52] U.S. Cl. .................... 165/178; 165/153; 285/382.2; 285/382.7
[58] Field of Search .................... 165/153, 178; 285/382.2, 382.7

[56] References Cited

U.S. PATENT DOCUMENTS

| | | | |
|---|---|---|---|
| 3,425,452 | 2/1969 | Shaw .............................. | 285/382.2 X |
| 4,296,804 | 10/1981 | Press et al. ....................... | 165/178 X |
| 4,482,174 | 11/1984 | Puri .................................. | 285/382.2 |
| 5,088,771 | 2/1992 | Hosseinian et al. ............. | 285/382.2 X |
| 5,358,034 | 10/1994 | Nishishita et al. .............. | 165/153 |
| 5,390,732 | 2/1995 | Bathla ............................. | 165/153 |

FOREIGN PATENT DOCUMENTS

| | | |
|---|---|---|
| 1 542 634 | 9/1968 | European Pat. Off. . |
| 1 383 267 | 12/1975 | United Kingdom . |
| 2 086 514 | 12/1982 | United Kingdom . |

*Primary Examiner*—Leonard Leo
*Attorney, Agent, or Firm*—Morgan & Finnegan, L.L.P.

[57] ABSTRACT

A plate type heat exchanger, which may for example be an evaporator for a motor vehicle air conditioning installation, comprises a stack of hollow plates with a pipe connector interposed in the stack. The flow circuit in which the heat exchanger is inserted includes a fluid flow tube coupled to the pipe connection of the heat exchanger by means of a coupling device which includes a clamping ring. This coupling device includes an intermediate sleeve having a cylindrical portion fitted intimately around a cylindrical end portion of the pipe connection, together with another cylindrical portion which serves in effect as an extension of the cylindrical end portion. The clamping ring is engaged around the outer cylindrical portion of the sleeve, so as to clamp the latter around the end of the fluid flow tube, the latter having previously been introduced into the sleeve and the end portion of the pipe connection.

20 Claims, 1 Drawing Sheet

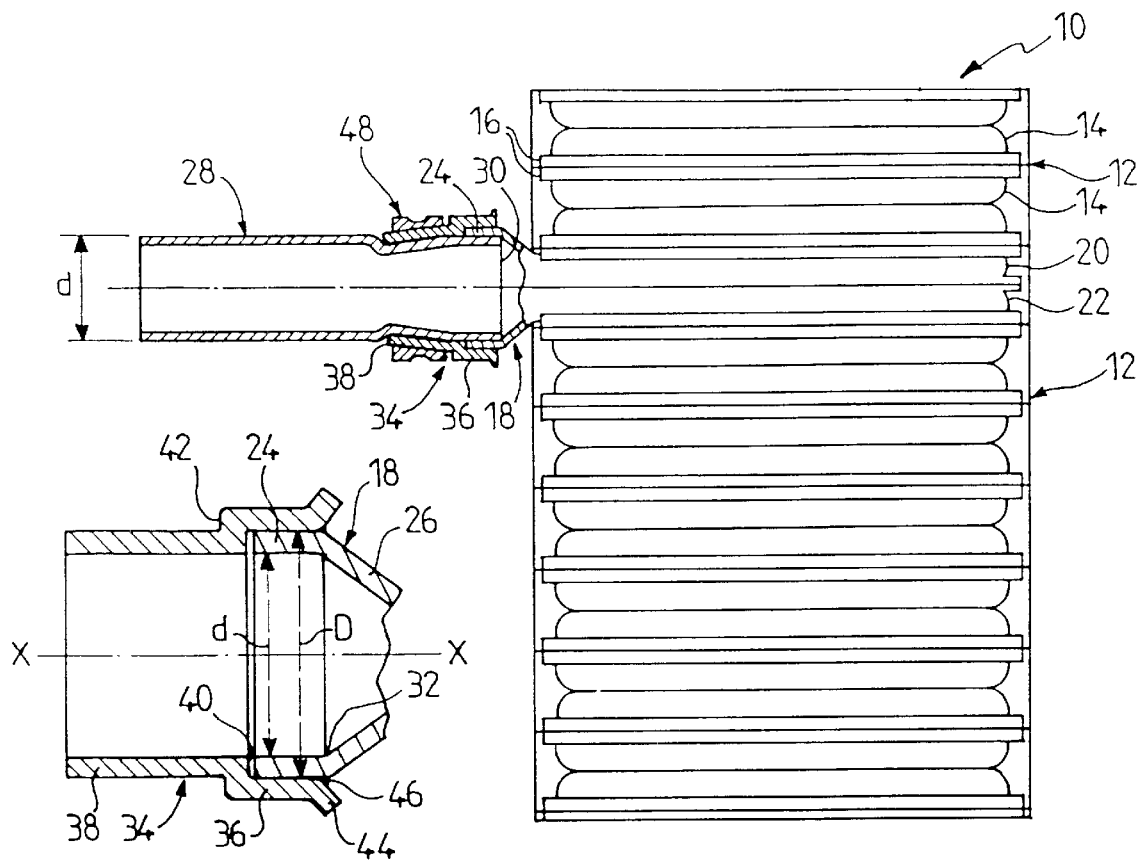
FIG.1
FIG.2
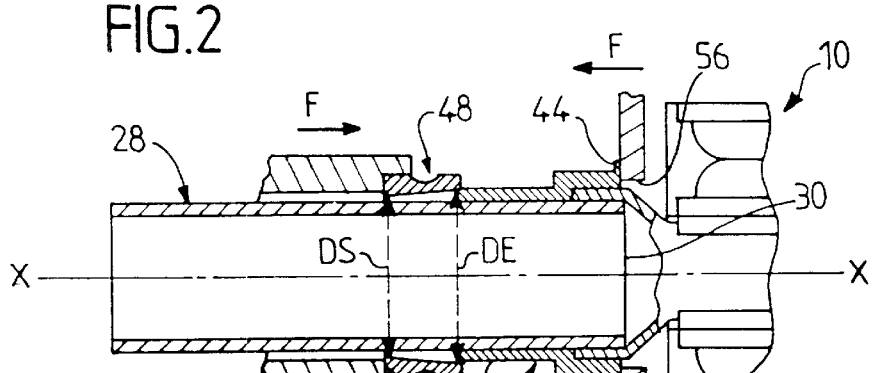
FIG.3
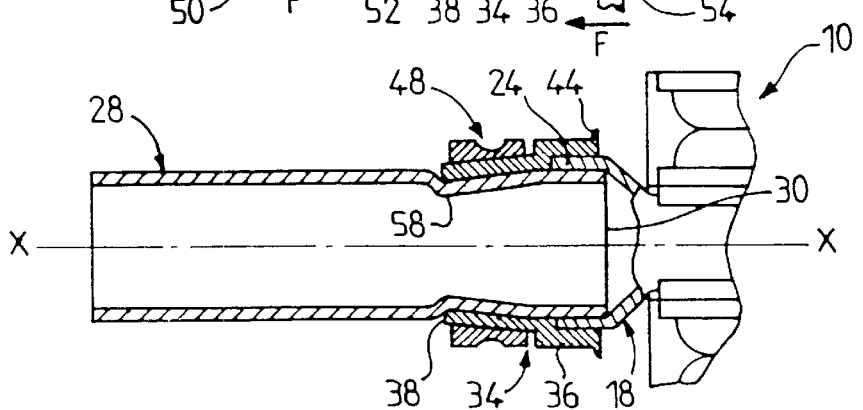
FIG.4

COUPLING DEVICE FOR A PLATE-TYPE HEAT EXCHANGER, ESPECIALLY FOR MOTOR VEHICLES

FIELD OF THE INVENTION

This invention relates to plate-type heat exchangers, and the like. In particular (though not exclusively) where such a heat exchanger is an evaporator which forms part of an air conditioning apparatus for a motor vehicle. More particularly, the invention relates to such a heat exchanger having a pipe connection coupled by means of a coupling device to a fluid flow tube of the fluid circuit in which the heat exchanger is connected. The invention is directed generally to the coupling device, and also relates to methods of fastening such a coupling device.

BACKGROUND OF THE INVENTION

Heat exchangers are known which include a pipe connection having a cylindrical end portion which is adapted to be coupled to a fluid flow tube by means of a clamping ring. Commonly, such a heat exchanger has two of these pipe connections, which serve as an inlet and an outlet respectively for a fluid which is arranged to flow through the heat exchanger. Where the heat exchanger is an evaporator in a vehicle air conditioning apparatus, this fluid is a refrigerant fluid for exchanging heat with a stream of air, to cool the latter before the air is admitted into the cabin of the vehicle.

In coupling devices of the known type mentioned above, the fluid flow tube is force-fitted into the cylindrical end portion of the pipe connection, and the clamping ring is then engaged axially around, and in direct contact with, the pipe connection, to grip the clamping ring on the pipe connection and to clamp the pipe connection and the end of the fluid flow tube firmly together. This gripping action includes a radial deformation of the pipe connection and also radial deformation of the fluid flow tube. These two components are thus assembled together intimately and permanently.

The clamping ring normally used is an aluminum ring having a particular profile which enables progressive radial gripping to take place, to a degree which depends on the amount by which the clamping ring is displaced axially around the pipe connection. It can however happen, in certain circumstances, that the gripping force exerted by the clamping ring is not regular, and this can lead to uncontrolled deformations of the pipe connection or the fluid flow tube or both. It can also sometimes give rise to leaks of fluid in the region of the coupling between the pipe connection and the fluid flow tube.

DISCUSSION OF THE INVENTION

A main object of the invention is to overcome the above mentioned drawback.

According to the invention, a coupling device for a plate-type heat exchanger, comprises a pipe connection for the heat exchanger. The pipe connection having a cylindrical end portion which is adapted to be coupled to an external fluid flow tube by means of an encircling clamping ring. This is characterised in that the coupling device includes an intermediate sleeve having a cylindrical first portion adapted to be intimately fitted around the cylindrical end portion of the pipe connection, together with a cylindrical second portion which is adapted to constitute in effect an extension of the cylindrical end portion of the pipe connection. The clamping ring is arranged to be engaged and forced around the cylindrical second portion of the intermediate sleeve, to clamp the cylindrical second portion around the tube, the tube having previously been introduced through the cylindrical second portion and into the cylindrical end portion of the pipe connection.

The word "cylindrical" is used in this document in its normal sense, in which it designates a cylindrical element with a circular cross section. The coupling device of the invention thus includes an intermediate sleeve having a stepped form, which acts as a spacer interposed between the pipe connection of the heat exchanger and the fluid flow tube which is to be coupled to the heat exchanger. The clamping ring is not only out of direct contact with the pipe connector, but is spaced axially away from the latter.

The cylindrical first portion of the intermediate sleeve fits closely around the cylindrical end portion of the pipe connection. The cylindrical second portion of the sleeve effectively extends the cylindrical end portion of the pipe connection, so providing those functions which up to the present time have been exercised by the end portion of the pipe connection itself. In this connection, the cylindrical second portion of the intermediate sleeve receives the fluid flow tube within it, and receives the clamping ring on its outside. As a result, during the assembly operation, in which a clamping force is exerted by the clamping ring as the latter is forced along and over the cylindrical second portion of the intermediate sleeve, it is this second portion (only) of the sleeve itself that is deformed, and not the pipe connection of the heat exchanger. Consequently, if any uncontrolled deformation is imparted to the cylindrical second portion of the intermediate sleeve, this cannot give rise to any possible leakage because the seal which is effected by the coupling is the direct seal between the fluid flow tube and the cylindrical end portion of the pipe connection, which is not itself deformed.

According to a preferred feature of the invention, the cylindrical first portion of the intermediate sleeve has an internal diameter which is substantially equal to the external diameter of the cylindrical end portion of the pipe connection. This enables the intermediate sleeve to be fitted very gently, or with a slight fitting force, snugly around the cylindrical end portion of the pipe connection.

Preferably, the cylindrical second portion of the intermediate sleeve has an internal diameter which is substantially equal to the internal diameter of the cylindrical end portion of the pipe connection. This feature leads to good and intimate fitting of the tube through the interior of the cylindrical second portion of the intermediate sleeve and into the interior of the cylindrical end portion of the pipe connection.

According to another preferred feature of the invention, the cylindrical second portion of the intermediate sleeve has an external diameter which is substantially equal to the external diameter of the cylindrical end portion of the pipe connection. This feature has the particular advantage that it enables the same clamping rings that have been used hitherto without any intermediate sleeve, to be used in the coupling device of the present invention.

Preferably, the cylindrical first portion and the cylindrical second portion of the intermediate sleeve are joined together through an internal annular shoulder constituting an abutment for limiting relative axial movement between the intermediate sleeve and the cylindrical end portion of the pipe connection during force-fitting of the clamping sleeve on to the said end portion of the pipe connection.

Again, and according to a further preferred feature of the invention, the cylindrical first portion and the cylindrical second portion of the intermediate sleeve are joined together through an external annular shoulder constituting an abutment for limiting relative axial movement between the clamping ring and the cylindrical second portion of the intermediate sleeve during fitting of the clamping ring on the second portion.

The invention also provides that, preferably, the intermediate sleeve has a layer of a braze metal applied on at least the internal face of the cylindrical first portion of the intermediate sleeve, whereby to enable the intermediate sleeve to be brazed around the pipe connection of the heat exchanger.

Preferably, the cylindrical first portion of the intermediate sleeve is terminated by a lip which is adapted to abut against a thrust element (i.e. a tool element) during fitting of the clamping ring around the cylindrical second portion of the intermediate sleeve. Thus, the axial displacement of the clamping ring can be obtained by means of appropriate tooling which comprises two thrust elements, which are in abutment against the clamping ring and against the lip of the intermediate sleeve respectively. The two thrust elements are subjected to relative axial movement to force the clamping ring along and over the second portion of the intermediate sleeve, so securing the coupling.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 1 is a partial side view, shown partly cut away, of a plate-type heat exchanger, having a pipe connection which is joined to a fluid flow tube through a coupling device in accordance with the invention.

FIG. 2 is a partial view in cross section showing the intermediate sleeve engaged about the cylindrical end portion of the pipe connection of the heat exchanger shown in FIG. 1.

FIG. 3 shows a detail of FIG. 1 on a larger scale, prior to fitting of the clamping ring.

FIG. 4 is a view in cross section similar to that in FIG. 3, but shows the coupling after the clamping ring has been fitted.

DESCRIPTION OF A PREFERRED EMBODIMENT OF THE INVENTION

Reference is first made to FIG. 1, which shows a heat exchanger 10 having a multiplicity of heat exchanger plates 12 stacked one against another. Each of the plates 14 consists of two half plates 12 which are joined together through matching peripheral edges 16 of the half plates. These edges delimit a closed profile on either side of a common assembly plane, so that each pair of half plates defines a fluid flow chamber between the half plates.

The heat exchanger also includes a pipe connection 18, which may serve either as an inlet or as an outlet for a fluid which flows through the heat exchanger 10. The pipe connection 18 is formed by joining together two half shells 20 and 22, which are assembled together and which are interposed in the stack of heat exchanger plates 12. The pipe connection 18 has a cylindrical end portion 24 which is joined to a frusto-conical intermediate portion 26, see FIG. 2. The cylindrical end portion 24 of the pipe connection 18 has an internal diameter d and an external diameter D.

The pipe connection 18 is arranged to be coupled to an external fluid flow tube 28. The external diameter of the fluid flow tube 28 is substantially equal to d, at least in the region of its free end 30. In this connection, the cylindrical portion of the tube 28 that terminates in the free end 30 is adapted to be introduced with substantially no friction, or with a slight degree of force-fitting, into the cylindrical end portion 24 of the pipe connection 18, until the end 30 of the tube comes into abutment with the inside surface of the pipe connection 18 in the region of the junction 32 between the end portion 24 and intermediate portion 26 of the pipe connection 18, which is most clearly shown in FIG. 2. The tube 28 is now telescoped snugly and sealingly into the connection 18.

The coupling device includes an intermediate sleeve 34, which is shown best in FIG. 2. The sleeve 34 comprises a cylindrical first portion 36, which is adapted to be intimately fitted around the cylindrical end portion 24 of the pipe connection 18, together with a cylindrical second portion 38 of smaller diameter than the first portion 36. The second portion 38 is such as to form, in effect, an axial extension of the cylindrical end portion 24 of the pipe connection 18. The cylindrical first portion 36 of the intermediate sleeve 34 has an internal diameter which is substantially equal to the outside diameter D of the cylindrical end portion 24 of the pipe connection 18, so as to enable these components to be fitted snugly together. In addition, the cylindrical second portion 38 of the intermediate sleeve has an internal diameter which is substantially equal to the internal diameter d of the cylindrical end portion 24 of the pipe connection. As a result, the fluid flow tube 28 can be introduced by its end 30, successively into and through the cylindrical second portion 38 of the sleeve, and into the cylindrical end portion 24 of the pipe connection 18, as can be seen in FIG. 3.

In addition, the cylindrical second portion 38 of the intermediate sleeve has an external diameter which is substantially equal to the external diameter of the cylindrical end portion of the pipe connection 18. As will be seen more clearly later herein, this feature enables standard clamping rings to be used. Up to the present time (as mentioned above), these clamping rings have been used for cooperating directly with the cylindrical end portion 24 of the pipe connection 18.

The cylindrical first portion 36 and the cylindrical second portion 38 of the intermediate sleeve 34 are joined together through an annular internal shoulder 40 (FIG. 2), which constitutes an abutment limiting relative axial movement during the force-fitting of the intermediate sleeve around the cylindrical end portion of the pipe connection 18.

In addition, the cylindrical portions 36 and 38 of the intermediate sleeve 34 are joined through an external annular shoulder 42, FIG. 2, which constitutes an abutment for limiting axial movement of the clamping ring which will be described below, during fitting of the latter. The cylindrical first portion 36 of the sleeve 34 terminates in a flared lip 44, FIG. 2. This lip 44 not only facilitates the fitting of the intermediate sleeve 34 around the end portion 24 of the pipe connection, but also serves as an abutment during the assembly operation.

The intermediate sleeve 34 is, in addition, coated with a layer of braze metal which is applied on at least the internal face of the cylindrical first portion 36, so as to enable the intermediate sleeve to be brazed around the pipe connection 18. The sleeve 34 can be brazed at the same time as the brazing operation by which the plates 12 are completed by brazing of the half plates 14 of each pair together, the half shells 20 and 22 being secured at the same time by brazing to the stack of plates 12. This brazing operation is carried out in an appropriate brazing oven. FIG. 2 shows diagrammatically at 46 the brazed joint thus formed between the end portion 24 of the pipe connection 18 and the cylindrical portion 36 of the intermediate sleeve 34.

The above mentioned clamping ring is shown at 48 in the drawings. The purpose of the clamping ring is to ensure a permanent coupling between the fluid flow tube 28 and the pipe connection 18. The clamping ring 48 is of a design known per se, which has however, up to the present time, been used for cooperation directly with the cylindrical end portion 24 of the pipe connection 18, as indicated above. The clamping ring 48 (see FIG. 3 in particular) has a leading or entry diameter DE and a trailing or exit diameter DS. The diameter DE is greater than the external diameter D of the cylindrical portion 34, while the diameter DS is smaller than the diameter D. Accordingly these diameters are greater and smaller, respectively, than the outside diameter of the cylindrical end portion 24 of the pipe connection 18.

The clamping ring 48 is arranged to be displaced along the axis XX of the fluid flow tube 28, FIG. 3, so as to exert a progressive radial clamping force. This causes the cylindrical second portion 38 to be deformed radially inwards, thereby forcing the intermediate sleeve 34 into intimate contact with and around the tube 28.

The relative axial displacement of the clamping ring 48 and intermediate sleeve 34 is obtained with the use of tooling which is indicated diagrammatically in FIG. 3. This tooling includes a first thrust element, or ram 50 which is in the form of a column, or tubular ram, arranged to surround the tube 28. This ram 50 terminates in an annular internal rebate 52, the profile of which is matched to that of the clamping ring 48. The tooling also includes a second thrust element, or anvil element, 54, which has a circular through hole 56 through which the pipe connection 18 is inserted. The anvil element 54 bears against the lip 44 of the intermediate sleeve 34. The two thrust elements 50 and 54 are moved towards each other, as indicated diagrammatically by the arrows F in FIG. 3, so that the clamping ring 48 is forced towards the shoulder 42 of the sleeve, and exerts a progressive radial clamping action on the cylindrical second portion 38 of the sleeve 34. This radial clamping action results in deformation of the cylindrical portion 38, as mentioned above, and also a deformation of the intermediate portion, 58, of the tube 28 which is surrounded by the cylindrical second portion 38. This can be seen in FIG. 4. It will be seen that because of the cooperating action of the ram 50 and the anvil element 54, the lip 44 tends to be flattened out into a radial configuration as shown in FIGS. 3 and 4.

It will be realised that the clamping ring 48 need not necessarily come into full abutment against the shoulder 42 of the intermediate sleeve 34, but may stop just short of this shoulder as is shown in FIG. 4. In either case, once the ring 48 has been fully engaged, the tool elements 50 and 54 are removed. There is now a definitive coupling between the tube 28 and the pipe connection 18, as shown in FIGS. 1 and 4.

It should be noted that the clamping ring 48 exerts its clamping action, not on the cylindrical end portion 24 of the pipe connection 18 as in the prior art, but instead, on the cylindrical portion 38 of the intermediate sleeve 34. As a result, if uncontrolled deformation appears in the region of the coupling between the cylindrical portion 38 and the tube 28, this deformation does not involve any risk of giving rise to leakage, because the cylindrical end portion 24 of the pipe connection 18, in which the end 30 of the tube 28 is received, undergoes no deformation at all. In addition, the cylindrical end portion 24 is protected on the outside by the cylindrical first portion 36 of the sleeve 34. Consequently, all of the forces exerted in the assembly operation are taken by the cylindrical portion 38 of the intermediate sleeve 34, and not by the cylindrical end portion 24 of the pipe connection 18 as in the prior art.

The intermediate sleeve 34 is a simple component which is easy to make. It can for example be made from aluminum or an aluminum alloy. In addition, the intermediate sleeve is compatible with clamping rings of the kind which are currently used for direct coupling between the fluid flow tube and the heat exchanger pipe connection.

Coupling devices according to the invention, such as that described above and shown in the drawings, are most particularly suitable in a motor vehicle air conditioning installation, in which the heat exchanger is an evaporator of the stacked plate type and the fluid flow tube is part of the circuit of the air conditioning installation, with a refrigerant fluid being passed through the evaporator and the tube.

What is claimed is:

1. A plate-type heat exchanger with a fluid flow tube having an end portion, the heat exchanger comprising:
    a stack of hollow plates forming a hollow interior;
    a pipe connector communicating with the interior of the hollow plates and having an end portion;
    an end portion on the fluid flow tube defining a free end thereof;
    coupling means for coupling the flow tube end portion to the pipe connector;
    an intermediate sleeve for the coupling means having a first portion fitted around the end portion of the pipe connector and a second portion forming an extension of the end portion of the pipe connector; and
    a clamping ring for the coupling means, the clamping ring engageable around the second portion in a manner to apply a clamping force to the second portion around the flow tube to radially deform and grip the flow tube therewithin while avoiding application of the clamping force to the first portion around the end portion of the pipe connector, the end portion of the fluid flow tube extending through the second portion and into the end portion of the pipe connector.

2. The heat exchanger according to claim 1, wherein the first portion of the intermediate sleeve has an internal diameter substantially equal to the external diameter of the end portion of the pipe connector.

3. The heat exchanger according to claim 1, wherein the second portion has an internal diameter substantially equal to the internal diameter of the end portion of the pipe connector.

4. The heat exchanger according to claim 1, wherein the second portion has an external diameter substantilly equal to the external diameter of the end portion of the pipe connector.

5. The heat exchanger according to claim 1, wherein the intermediate sleeve defines a junction between the first and second portions, the junction having an internal annular shoulder comprising an abutment for limiting relative movement the intermediate sleeve and the end portion of the pipe connector during force-fitting of the sleeve on the end of the pipe connector.

6. The heat exchanger according to claim 1, wherein the intermediate sleeve further comprises an internal surface for the first portion and braze metal applied over at least the internal surface of the first portion of the intermediate sleeve, the intermediate sleeve being brazed around the pipe connector.

7. A plate-type heat exchanger with a fluid flow tube having an end portion, the heat exchanger comprising:
   a stack of hollow plates forming a hollow interior;
   a pipe connector communicating with the interior of the hollow plates and having an end portion;
   an end portion on the fluid flow tube defining a free end thereof;
   coupling means for coupling the flow tube end portion to the pipe connector;
   an intermediate sleeve for the coupling means having a first portion fitted around the pipe connector end portion, a second portion forming an extension of the pipe connector end portion; and
   a clamping ring for the coupling means, the clamping ring engageable around the second portion in a manner to apply a clamping force to the second portion around the flow tube to radially deform and grip the flow tube therewithin while avoiding application of the clamping force to the first portion around the end portion of the pipe connector, the end portion of the fluid flow tube extending through the second portion and into the end portion of the pipe connector,
   wherein the intermediate sleeve defines a junction between the first and second portions thereof, the junction forming an external annular shoulder comprising an abutment for limiting relative movement between the clamping ring and the cylindrical second portion during fitting of the clamping ring on the second portion.

8. An apparatus for connecting a pipe connector of a plate-type heat exchanger to a fluid flow tube, comprising:
   a sleeve having a first portion engageable around an end portion of the pipe connector and a second portion forming an extension of the end portion of the pipe connector, the fluid flow tube extending through the second portion and into the end portion of the pipe connector; and
   a clamping ring engageable around the second portion in a manner to apply a clamping force to the second portion around the flow tube to radially deform and grip the flow tube therewithin while avoiding application of the clamping force to the first portion around the end portion of the pipe connector.

9. The apparatus according to claim 8, wherein the sleeve defines a junction between the first and second portions thereof, the junction forming an external annular shoulder for limiting relative movement between the clamping ring and the second portion during engagement of the clamping ring on the second portion.

10. The apparatus according to claim 8, wherein the first and second portions are cylindrical.

11. A plate-type heat exchanger comprising:
    a fluid flow tube;
    a stack of hollow plates forming a hollow interior;
    a pipe connector communicating with the interior of the hollow plates and having an end portion;
    a sleeve having a first portion engageable around the end portion of the pipe connector and a second portion forming an extension of the end portion of the pipe connector, the fluid flow tube extending through the second portion and into the end portion of the pipe connector; and
    a clamping ring engageable around the second portion in a manner to apply a clamping force to the second portion around the flow tube to radially deform and grip the flow tube therewithin while avoiding application of the clamping force to the first portion around the end portion of the pipe connector.

12. An air conditioning apparatus comprising:
    heat exchanger having:
    a fluid flow tube;
    a stack of hollow plates forming a hollow interior;
    a pipe connector communication with the, interior of the hollow plates and having an end portion;
    a sleeve having a first portion engageable around the end portion of the pipe connector and a second portion forming an extension of the end portion of the pipe connector, the fluid flow tube extending through the second portion and into the end portion of the pipe connector; and
    a clamping ring engageable around the second portion in a manner to apply a clamping force to the second portion around the flow tube to radially deform and grip the flow tube therewithin while avoiding application of the clamping force to the first portion around the end portion of tipe connector.

13. A motor vehicle comprising:
    an air conditioning apparatus including a heat exchanger having;
    a fluid flow tube;
    a stack of hollow plates forming a hollow interior;
    pipe connector communicating with the interior of the hollow-plate and having an end portion;
    a sleeve having a first portion engageable around the end portion of the pipe connector and second portion forming an extension of the end portion of the pipe connector, the fluid flow tube extending through the second portion and into the end portion of the pipe conector; and
    a clamp ring engageable around the second portion in a manner to apply a clamping force to the second portion around the flow tube to radially deform and grip the flow tube therewithin while avoiding application of the claiming force to the first portion around the end portion of the pipe connector.

14. An apparatus for connecting a pipe connector of a plate-type heat exchanger to a fluid flow tube, comprising:
    a sleeve having a first portion engageable around an end portion of the pipe connector and a second portion forming an extension of the end portion of the pipe connector, the fluid flow tube extending through the second portion and into the end portion of the pipe connector; and
    a clamping ring engageable around the second portion to radially deform the second portion and grip the flow tube therewithin, the clamping ring being spaced axially away from the pipe connector.

15. The apparatus according to claim 14, wherein the sleeve defines a junction between the first and second portions thereof, the junction forming an external annular shoulder for limiting relative movement between the clamping ring and the second portion during engagement of the clamping ring on the second portion.

16. The apparatus according to claim 14, wherein the first and second portions are cylindrical.

17. A plate-type heat exchanger comprising:
    a fluid flow tube;
    a stack of hollow plates forming a hollow interior;

a pipe connector communicating with the interior of the hollow plates and having an end portion; and the apparatus according to claim 14.

18. An air conditioning apparatus including the heat exchanger according to claim 17.

19. A motor vehicle including the air conditioning apparatus according to claim 18.

20. A method of connecting a pipe connector of a plate-type heat exchanger to a fluid flow tube, comprising:

engaging a sleeve around the pipe connector, the sleeve having a first portion engageable around an end portion of the pipe connector and a second portion forming an extension of the end portion of the pipe connector, the fluid flow tube extending through the second portion and into the end portion of the pipe connector; and engaging a clamping ring around the second portion in a manner to apply a clamping force to the second portion around the flow tube to radially deform and grip the flow tube therewithin while avoiding application of the clamping force to the first portion around the end portion of the pipe connector.

* * * * *

UNITED STATES PATENT AND TRADEMARK OFFICE
CERTIFICATE OF CORRECTION

PATENT NO. : 5,988,270
DATED : November 23, 1999
INVENTOR(S) : Christophe Chevallier Page 1 of 1

It is certified that error appears in the above-identified patent and that said Letters Patent is hereby corrected as shown below:

<u>Title page,</u>
References Cited [56] under the subheading FOREIGN PATENT DOCUMENTS, after "1 542 634    9/1968" delete "European Pat. Off." and insert therefor -- France --.

<u>Claim 5, column 6,</u>
Lines 61-62, after "movement" insert -- between --.

<u>Claim 12, column 8,</u>
Line 8, prior to "heat" insert -- a --.
Line 11, delete "communication" and insert therefor -- communicating --.

<u>Claim 13, column 8,</u>
Line 31, delete "-plate" and insert therefor -- plates --.

Signed and Sealed this

Eleventh Day of September, 2001

*Attest:*

*Nicholas P. Godici*

*Attesting Officer*

NICHOLAS P. GODICI
*Acting Director of the United States Patent and Trademark Office*